US006826811B2

(12) United States Patent
Adams

(10) Patent No.: US 6,826,811 B2
(45) Date of Patent: Dec. 7, 2004

(54) JAW-TYPE CLIP

(75) Inventor: William E. Adams, Portersville, PA (US)

(73) Assignee: Adams Mfg. Corp., Portersville, PA (US)

( * ) Notice: Subject to any disclaimer, the term of this patent is extended or adjusted under 35 U.S.C. 154(b) by 2 days.

(21) Appl. No.: 10/177,357

(22) Filed: Jun. 21, 2002

(65) Prior Publication Data

US 2003/0233740 A1 Dec. 25, 2003

(51) Int. Cl.[7] .................................................. F16B 2/10
(52) U.S. Cl. ........................................................ 24/499
(58) Field of Search .............................. 24/67.3–67.11, 24/67 R, 499–501; D8/395; D9/65, 86; 223/90, 91, 93, 96; 269/254 R

(56) References Cited

U.S. PATENT DOCUMENTS 2,464,739 A 3/1949 Solomon et al.
2,638,908 A * 5/1953 Schildt ....................... 132/277
2,979,060 A * 4/1961 Reiner ........................ 132/277
3,030,681 A 4/1962 Phillips
3,030,970 A * 4/1962 Gold .......................... 132/277
3,597,813 A 8/1971 Takahashi
3,756,550 A 9/1973 Kollitz
4,277,864 A 7/1981 Orson, Sr.
4,340,061 A * 7/1982 Kees et al. ................. 606/158
4,559,029 A * 12/1985 Miranti et al. .............. 474/251
RE32,269 E * 10/1986 Bisk et al. .................... 223/91
D286,013 S 10/1986 Adams
D299,006 S * 12/1988 Mednick ...................... D8/388
4,798,553 A * 1/1989 Gentles et al. ................ 446/99
4,830,322 A * 5/1989 Gary ....................... 248/206.5
4,840,341 A 6/1989 Hasegawa
4,987,659 A 1/1991 Grandis
D328,242 S * 7/1992 Chan ........................... D8/388
5,153,969 A 10/1992 Arrendiell et al.
5,179,768 A 1/1993 Jio
5,301,393 A 4/1994 Brown
5,402,558 A * 4/1995 Santapa ........................ 24/511
5,452,500 A 9/1995 Revis
6,073,318 A 6/2000 Phillips
6,276,849 B1 * 8/2001 Feitel et al. ................ 400/242
6,393,668 B1 * 5/2002 Olson et al. ................ 24/67 R

FOREIGN PATENT DOCUMENTS

DE 25 28 005 1/1977
JP 04223198 A * 8/1992 ............. B42F/1/02

* cited by examiner

*Primary Examiner*—James R. Brittain
(74) *Attorney, Agent, or Firm*—Buchanan Ingersoll, PC

(57) ABSTRACT

A two piece jaw type clip has a standard base member and a decoratively shaped top member that could be any of a number of pleasing shapes that can be interchangeably attached to the base. The base member has a generally flat or single step shaped body having a spring portion that extends in an arc over the body. The body of the base has slots or sockets that receive complimentary legs or prongs extending from the underside of the top piece to enable pivotable attachment of the two members together. Alternatively the legs could extend from the base into sockets in the top member. The top member has a cutout through which the spring portion from the base member extends and presses the top member against the base.

13 Claims, 9 Drawing Sheets

JAW-TYPE CLIP

BACKGROUND

1. Field of the Invention

The invention relates generally to spring clip devices and particularly to jaw-type spring clip devices. A magnet may be attached thereto for holding the spring clip device against a metal object such as a refrigerator or filing cabinet.

2. Description of Related Art

Spring clips are well known in the art, as are devices having magnetic bases for holding the spring clip against a metal surface. For example, my U.S. Design Pat. No. Des. 286,013 discloses a spring clip having a two mating body members that pivot relative to one another about their middle and are held together by a U-shaped plastic spring. The body members are in the shape of a man with outstretched arms and legs spread apart. They are attached back to back. The clip is opened by pressing or squeezing the head of one body member toward the head of the second body member causing the feet of the two body members to move away from on another. In one commercial embodiment of this design a magnet is attached to the head of one of the body members. While this product has been quite successful, the item requires three molded pieces that must be assembled by hand. Other body shapes could be provided to make similar jaw type clips, but a new mold would be required for both sides of each new shape. A jaw type clip made of only two parts that are easy to assemble should be less expensive to produce.

Several two-piece jaw-type clips have been proposed. Brown in U.S. Pat. No. 5,301,393 discloses a spring biased two piece jaw type clip in which the front of the two pieces have the same shape. The backs of the two pieces have prongs or a ball and socket that snap together. A plastic cantilever spring is attached or molded to extend from the back of one piece and press against the other piece. A similar jaw-type clip is disclosed in U.S. Pat. No. 4,840,341 to Hasegawa. Another two-piece spring clip is disclosed by Grandis in U.S. Pat. No. 4,987,659. One member is generally flat and T-shaped. The second member has a bowed curvature and ears that fit into prongs on the T-shaped member. Phillips in U.S. Pat. No. 3,030,681 and Solomon et al. in U.S. Pat. No. 2,464,739 disclose two-piece clips made of two elongated members. One member has pivot pins and a spring extending from a back surface. The second member fits under the pins and rests against the spring. None of these patents teach or suggest a two-piece clip in which one piece could be any of a number of pleasing shapes and the second piece is a base to which any of these shapes could be attached.

It is also known in the art to provide spring clips that are attachable to flat surfaces using a suction cup instead of magnets. One such device is disclosed in U.S. Pat. No. 5,356,102 to Blumenaus. Blumenaus discloses a flexible plastic clip member attached to the neck portion of a suction cup member. The flexible clip member has a first end which is normally biased against the surface to which the suction cup member is attached and a second end which can be pushed to create a gap between the first end and the mounting surface. When the second end is pushed, the clip member pivots about the neck portion of the suction cup that creates a gap between the first end of the clip member and the mounting surface.

The two aforementioned types of prior art clip devices are only a representative portion of the numerous types of clip devices that are known in the art. However, none of these prior art clip devices are two-piece clips in which one member is a standard base and the second member can be any of a number of selected shapes with the shapes being interchangeable on the base. Such a clip would have endless design possibilities with each design being less expensive to produce than if a similar design had been incorporated in a jaw-type clip in the prior art.

Accordingly, there is a need for a spring clip made of two pieces, one piece being a common base and the second piece being any of a number of pleasing shapes that can be interchangeably attached to the base.

SUMMARY

I provide a two piece jaw type clip having a standard base member and a decoratively shaped top member that could be any of a number of pleasing shapes that can be interchangeably attached to the base. The base member has a generally flat or single step shaped body having a spring portion that extends in an arc over the body. The body of the base has slots or similar structure that receives complimentary legs or prongs extending from the underside of the top piece to enable pivotable attachment of the two members together. The top member preferably has a flat body configured in any pleasing shape such as frog, a butterfly or a fish. The body has a cutout or aperture through which the spring portion from the base member extends and presses the top member against the base. The end of the spring presses against the top surface of the top member.

I prefer to provide a shoulder on opposite sides of the base that has a ramp or inclined surface leading to a slot. The legs or prongs that extend from the back of the top member have a rounded end. This configuration enables the top piece to be fitted onto the base by sliding the prongs up the ramp. The front end of the spring may be angled for easier assembly.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF THE PREFERRED EMBODIMENTS

Figure 8:
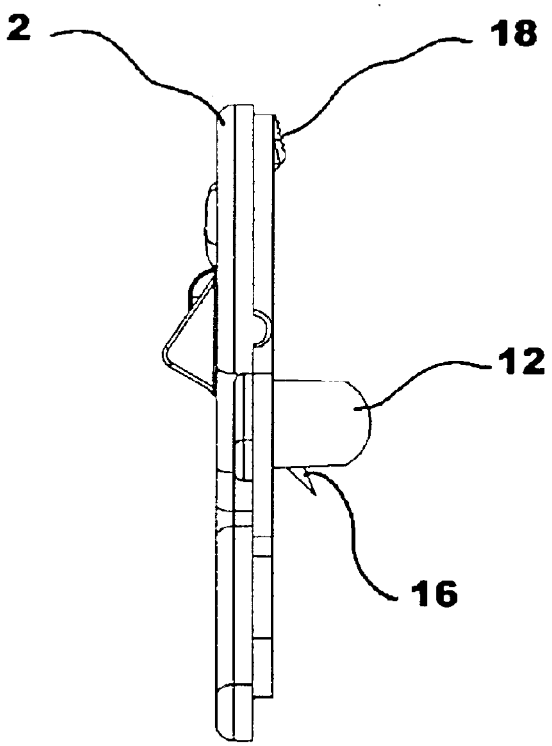
FIG. 8 is a right side view of the top member shown in FIGS. 6 and 7.

A first present preferred embodiment of the two piece spring clip 1 shown in FIGS. 1 through 8 has a top member 2 and a base member 3. In this embodiment the top member is shaped like a fish having a head 10 with eyes 11, fins 15 and a tail 8. The base member 3 has an upper body portion 7 and a lower body portion 9 configured to create a recess in which a magnet 20 shown in FIG. 4 can be attached to the base. I prefer to mold a post 28 on the upper body portion 7 on which the magnet 20 is held. There is a spring portion 5 extending from the upper body portion 7 of the base 3 through an aperture or cutout 4 in the top member 2. The distal end of this spring or a tooth 25 on that distal end presses against the top surface 6 of the top member. The base 2 is preferably molded of a plastic such as polycarbonate to enable the spring portion to flex upward away from the lower body portion 9. When the spring clip 1 is assembled the spring portion 5 has flexed upwardly from its original position shown in FIGS. 4 and 5. Consequently, the spring portion 5 exerts a force against the top surface 6 of the top member 2 thereby biasing the spring clip 1 toward the closed position shown in FIGS. 1 and 2. The amount of pressure applied to the top member by the spring is a function of the type of plastic selected for the spring, the thickness of the spring and the amount of displacement from its original relaxed position shown in FIG. 5. For any given base one could create increase the pressure exerted by the spring by increasing the thickness of the top member or, by increasing the size of the nub or tooth at the distal end of the spring. This could be done with a change in the mold. If a commercial user needed a stronger spring, the tooth at the end of the spring would be lengthened, possibly by an adjustable screw in the mold. If a weaker spring were needed, the tooth could be reduced in size. Consequently, one can create higher tension spring clips or lower tension spring clips using the same base by simply changing the thickness of the top member or the distal end of the spring. A pair of legs or prongs 12 extend from the bottom surface 14 of the top member 2 and are seated within slots 13 in the base member 3. These legs 12 are rounded to enable them to act as a fulcrum. Whenever the tail 8 of the top member 2 is pressed toward the upper portion 7 of the base member 3, the top member 2 will pivot on legs 12 causing the opposite end of the spring clip to open. Although I prefer to provide a pair of legs, a single leg or more than two legs could be provided. There should be a slot for each leg. A gripping surface 18 is provided on the underside of the top member near the front edge. This gripping surface may be a series of spaced apart ridges as shown or may have teeth or rounded projections (not shown) that can bite into an object placed between the top member and the lower body portion of the base. This surface may be angled relative to the top member as shown in FIG. 8 to provide a larger surface area parallel to the gripping end 17 of the base member 4 when the spring clip is assembled.

Figure 1:
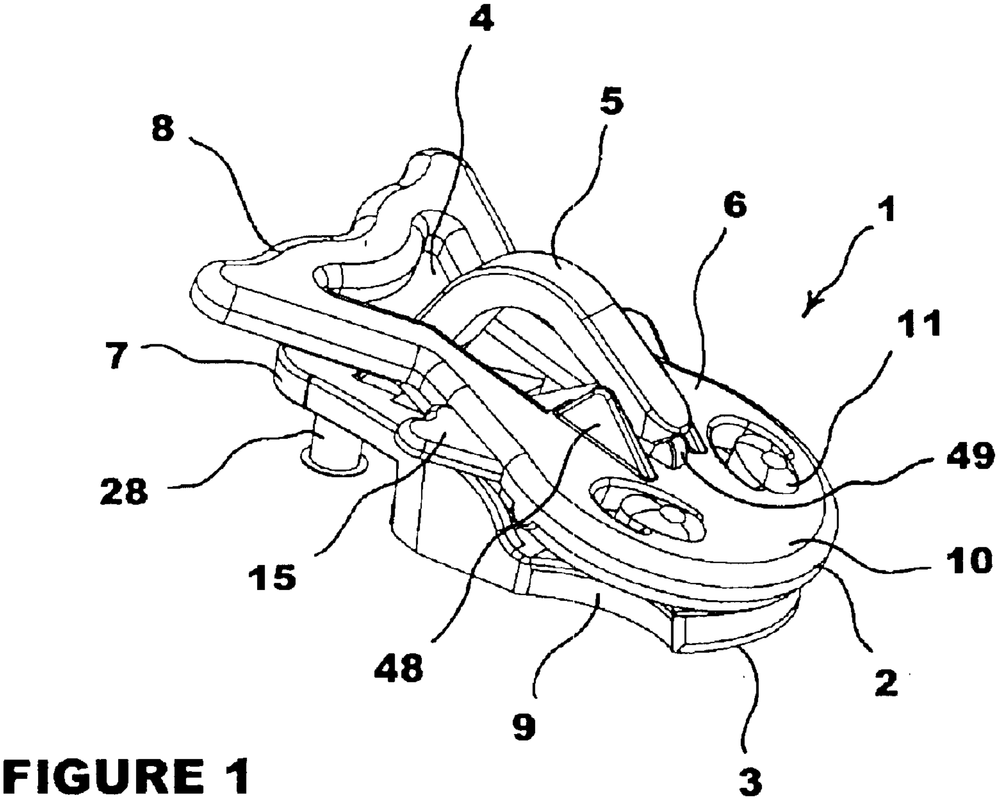
FIG. 1 is a perspective view of a preferred embodiment of the invention.
Figure 2:
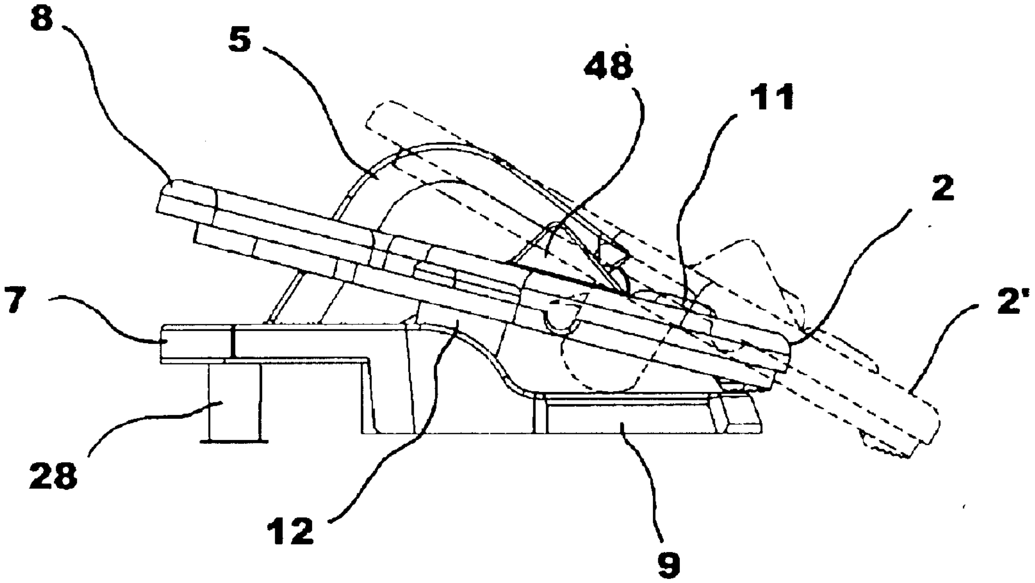
FIG. 2 is a right side view of the embodiment shown in FIG. 1.
Figure 3:
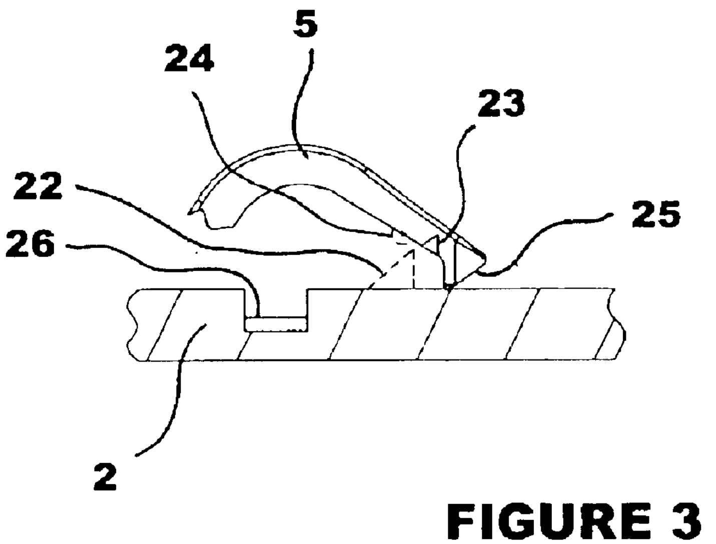
FIG. 3 is a fragmentary view of a portion of the top member and spring showing an alternative configuration of the body.
Figure 4:
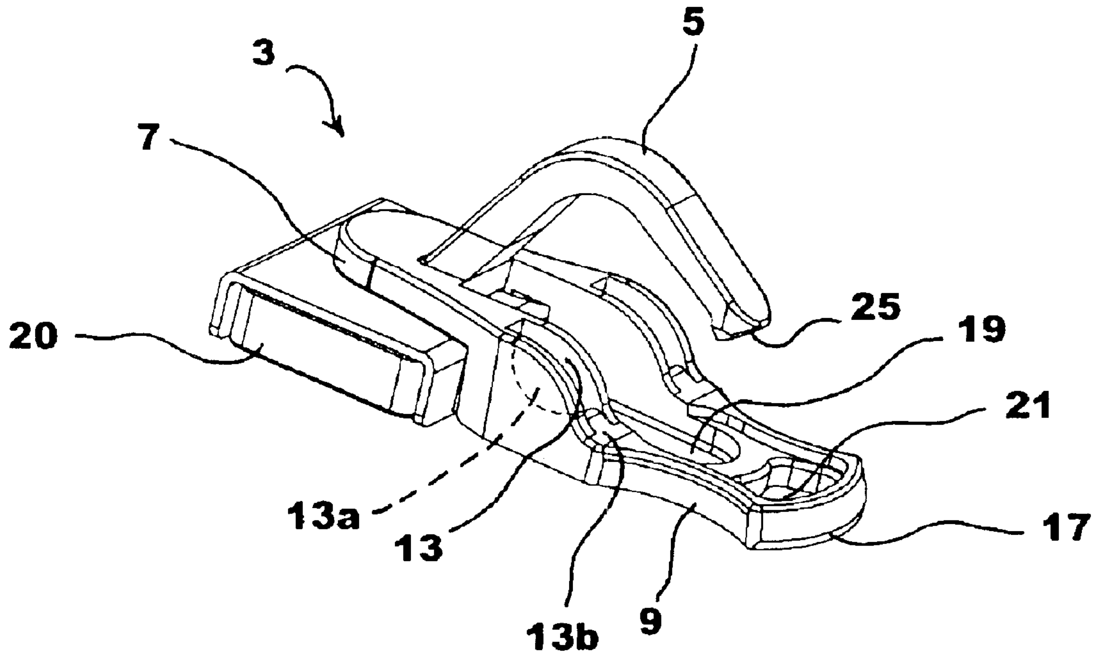
FIG. 4 is a perspective view of the base member in the embodiment of FIG. 1 to which an optional magnet is attached.

The present spring clip 1 is easy to assemble as can be seen by referring to FIGS. 2 and 4. To begin assembly, the top member 2 is positioned on the base 3 as shown by the top 2' in dotted line in FIG. 2. In this position the legs 12 rest on the base 2 at a position in front of slots 13 and the distal end of the spring portion 5 is in the cutout 4 resting against a ramp 16 on the top surface 6 of the top member 2. As can be seen in FIG. 4 the slots or sockets 13 are configured to have a semicircular cavity 13a behind a raised portion or shoulder 13*b*. When the top member positioned as shown by the dotted lines in FIG. 2 is pushed from right to left in FIG. 2 toward the upper portion 7 of the base, the distal end of the spring portion 5 rides up the ramp 16 to the final position shown in FIGS. 1 and 2. The angled front surface 27 of the spring 5 seen most clearly in FIG. 5 helps that movement. At the same time legs 12 go over shoulder 13*b* and are seated in cavity 13*a*. The shoulder 13*b* may be inclined toward the lower body member 9 to provide a ramp over which the legs travel into the cavity 13*a*. The cavity and shoulder construction of slot 13 makes it relatively easy to move the legs into the slot and relatively difficult to remove the legs from the slot by pushing the top member 2 in a direction opposite the direction that the top member moved into the slot. To make it even more difficult to remove the top portion 2 from the base portion 3 a tooth 25 is provided at the distal end of the spring portion 5. In one embodiment a slot 47 is provided in the tooth 25 that receives a rib 49 on the top surface 6 of the top member. In another embodiment shown in FIG. 3 a small slot 26 is provided in the top surface 6 of the top member. The tooth 25 will fall into the slot 26 if the end of the clip moves over the slot. The tooth 25 is configured to have a front surface 27 that meets the slot at an angle when the clip is assembled for easy passage over the slot during assembly. The rear 29 of the tooth is parallel to the sides of the slot 26 causing the tooth to be caught if the top portion 2 is moved in an opposite direction, that is, from left to right in FIG. 2. An alternative catch can be created by providing a projection or tooth 22 shown in dotted line in FIG. 3. One side of the projection 22 is inclined to allow the spring to slide over the projection easily during assembly while the opposite side of the projection is vertical to engage the tooth. A notch 23 may be provided in the underside of the spring to receive the top of the projection 22. Another option is to provide a bump 24 on the underside of the spring 5 so that the projection 22 is captured between the bump and the tooth. The spring 5 pressing against the top surface 6 of the top member 2 keeps the legs 12 in slots 13. Fins 48 are provided on the top surface 6 of the top member to prevent side to side movement of the top member 2 relative to the spring 5 and base 3.

Figure 5:
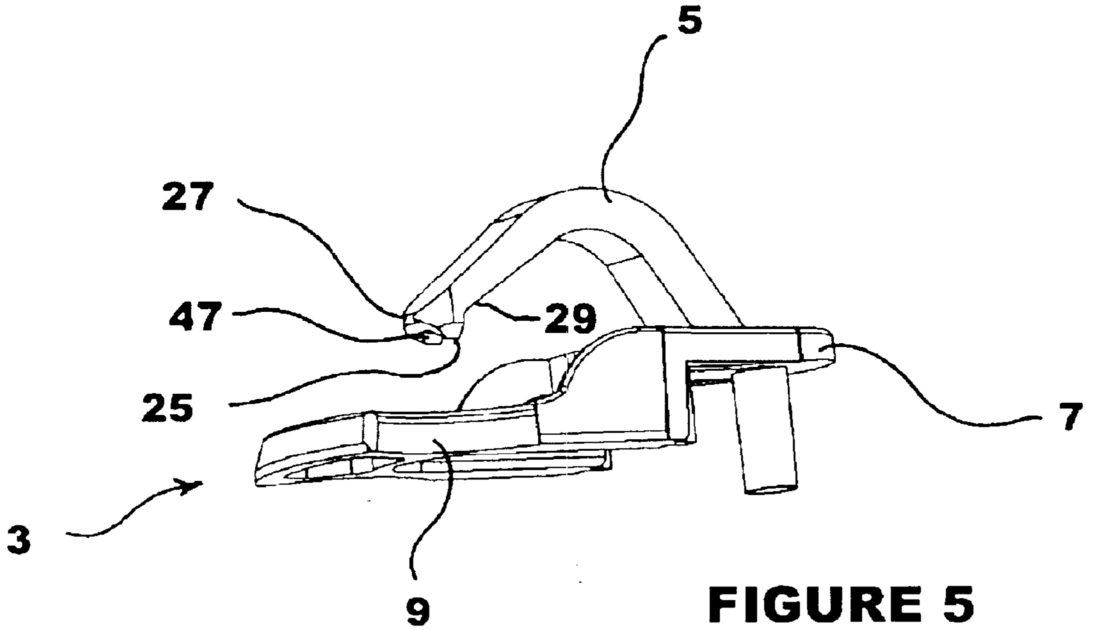
FIG. 5 is a perspective view of the base member shown in FIG. 4 without the magnet.
Figure 6:
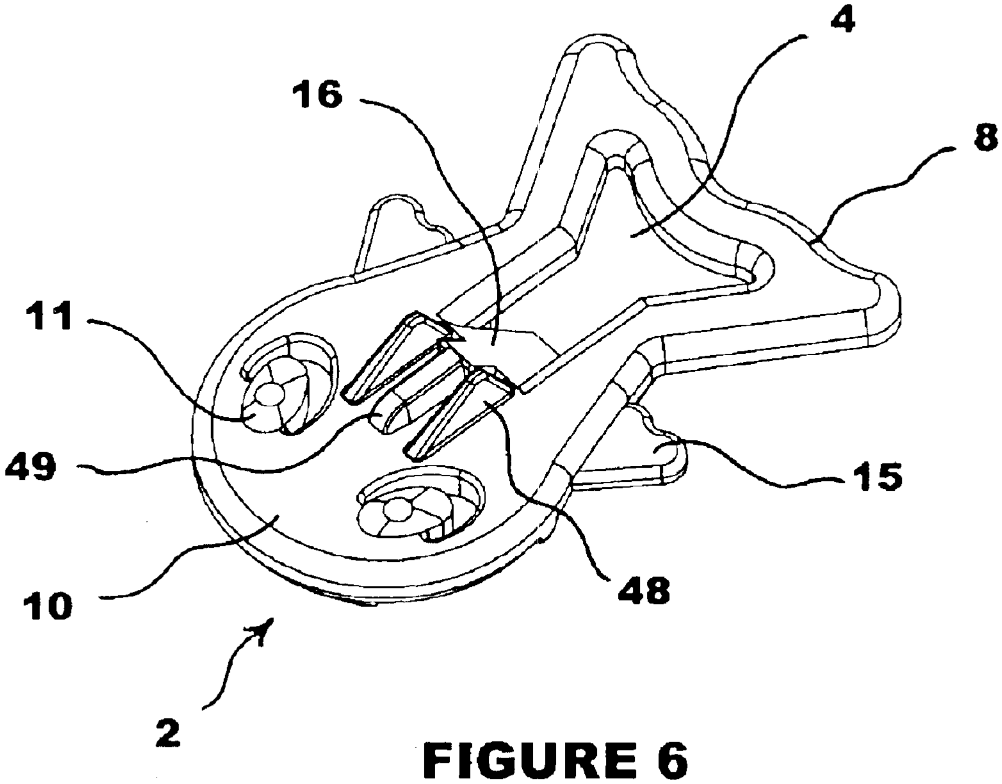
FIG. 6 is a top perspective view of the top member of the embodiment shown in FIG. 1.
Figure 7:
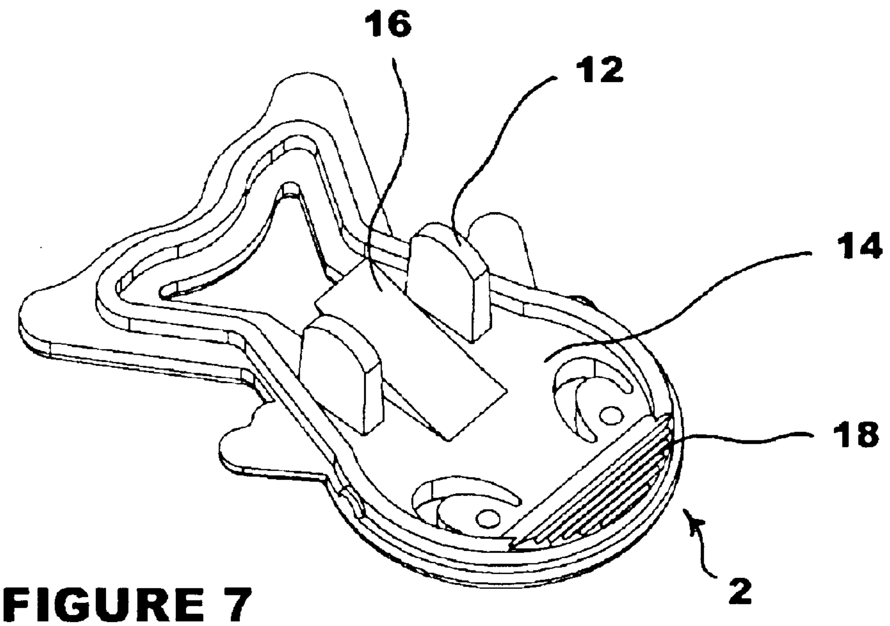
FIG. 7 is a perspective view of the top member shown in FIG. 6 showing the bottom of that member.

FIGS. 4 and 5 show a present preferred configuration for the base member 4. This base member is preferably molded from polycarbonate or other resin with good memory. Cut outs 19 and 21 are provided simply to save material and reduce cost. This base can be molded in a two piece mold. The shape of the spring 5 allows the spring to fit through the cutout in the top member before and after assembly. The shape works well because forces are spread out over a long distance keeping stress from building up to the breaking point of the spring. There is less stress in the spring of this design than in a U-shaped spring of the type used in the clip of U.S. Pat. No. Des. 286,013. Movement of the spring in a prototype of the present clip was compared to movement of the U-shaped spring in a commercial embodiment of the clip in the '013 design patent when the clips were opened. In the closed position shown in FIGS. 1 and 2 the end of the clip 5 is 0.69 inches from the base 3. When the clip is opened to a position where the end of the base 3 and the end of the top member 2 are 0.354 inches apart the end of the spring is 0.84 inches from the base. Consequently, the end of the spring moved 0.15 inches away from the base. Also the end of the spring had slid 0.175 inches across the top member toward the open end of the clip. In contrast, when the clip at the '013 design patent is opened so the ends are 0.34 inches apart the end of the U-shaped spring moves from a position 0.57 inches from the base member to 0.76 inches from that member. Hence, that spring moved 0.21 inches. The greater movement of the U-shaped spring means that more stress is present in the spring of the prior art clip than in the spring of the present clip.

Figure 9:
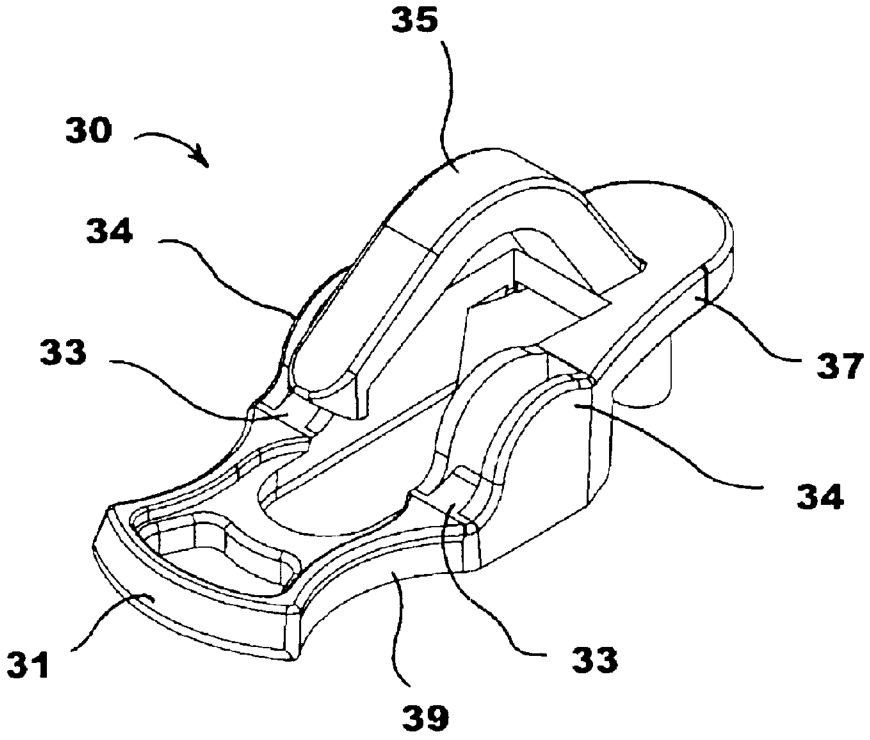
FIG. 9 is a top perspective view of an alternative embodiment of the base member.
Figure 10:
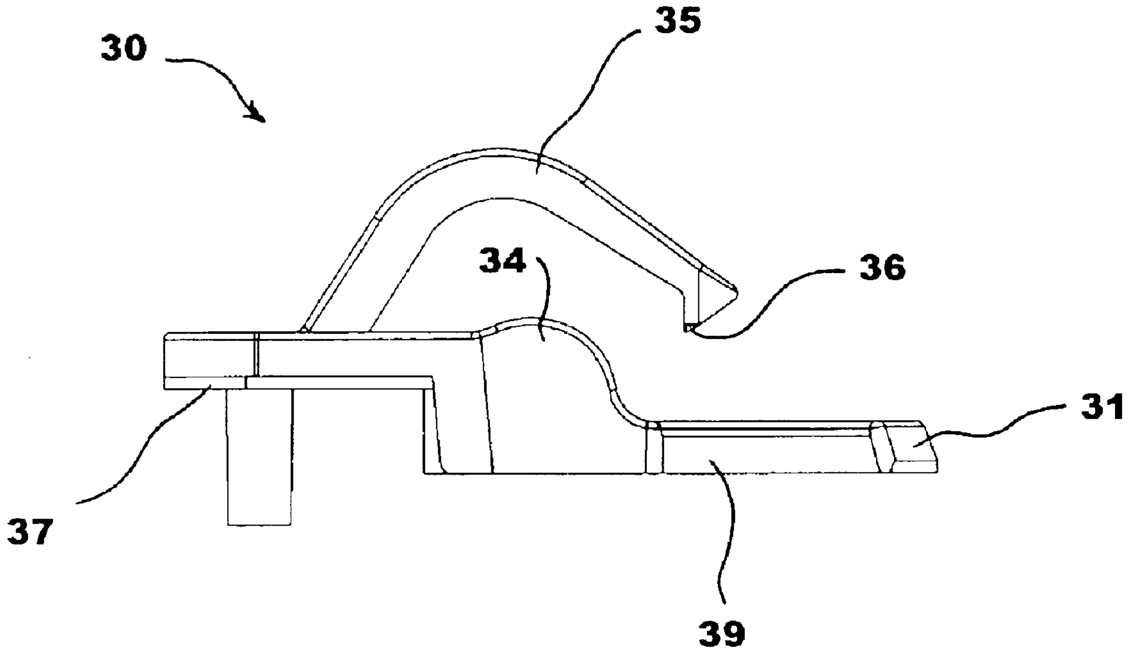
FIG. 10 is a side view of the base member shown in FIG. 9.

A second preferred base member 30 is shown in FIGS. 9 and 10. This base member has a profile similar to the profile of the first embodiment with an upper body portion 37 and lower body portion 39. The spring 35 is similar but the tooth 36 at the end of the spring is cut at a steeper angle. The front edge 31 of the lower body member 39 is sloped or beveled to allow the legs 12 of the top member to easily ride onto the lower body member 39 during assembly. The outer walls 34 adjacent slots 33 are higher to better capture the legs of the top member preventing movement of the top member from side to side and minimizing the likelihood of a user dismantling the clip.

Figure 11:
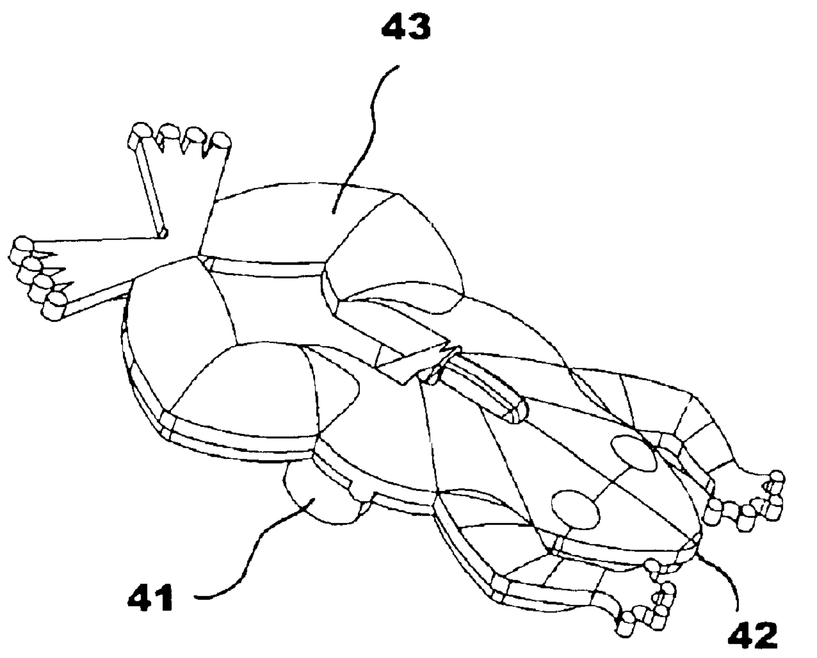
FIG. 11 is top perspective view of the top member shaped like a frog for a second present preferred embodiment of the invention.
Figure 12:
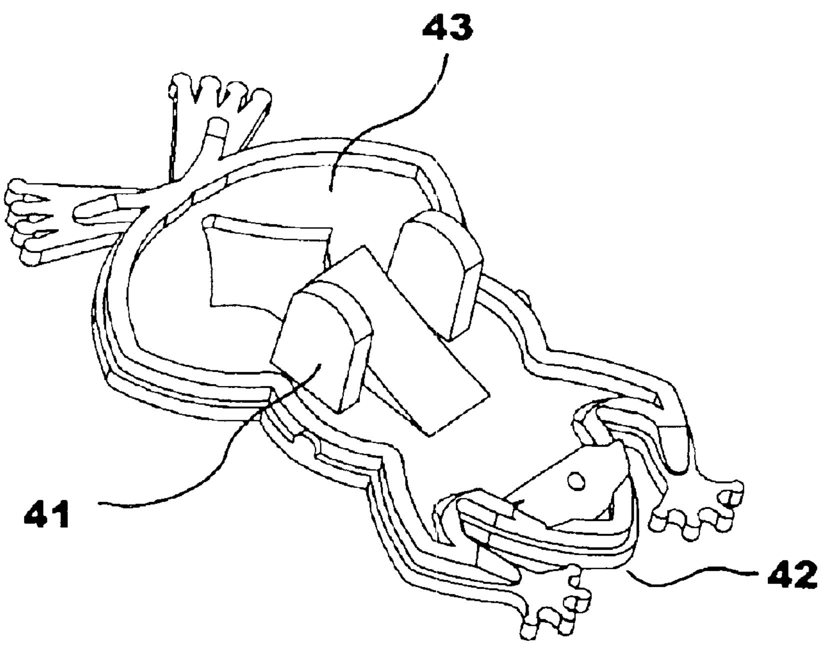
FIG. 12 is a bottom perspective view of the top member of the embodiment shown in FIG. 11.

In a second preferred spring clip 40 shown in FIGS. 11 and 12 the top member 42 is in the form of a frog. The legs 43 of the frog define the cutout through which the spring of the base member passes. Prongs 41 similar to those in the first embodiment extend from the underside of the top member 42 and fit into the slots in the base member. The top member 42 fits on the base members shown in FIGS. 4, 5, 9 and 10 and is assembled onto the base in the same manner as the first embodiment. There are many other shapes, in which the cutout slot is formed by the shape of the top figure, that may be used.

Figure 13:
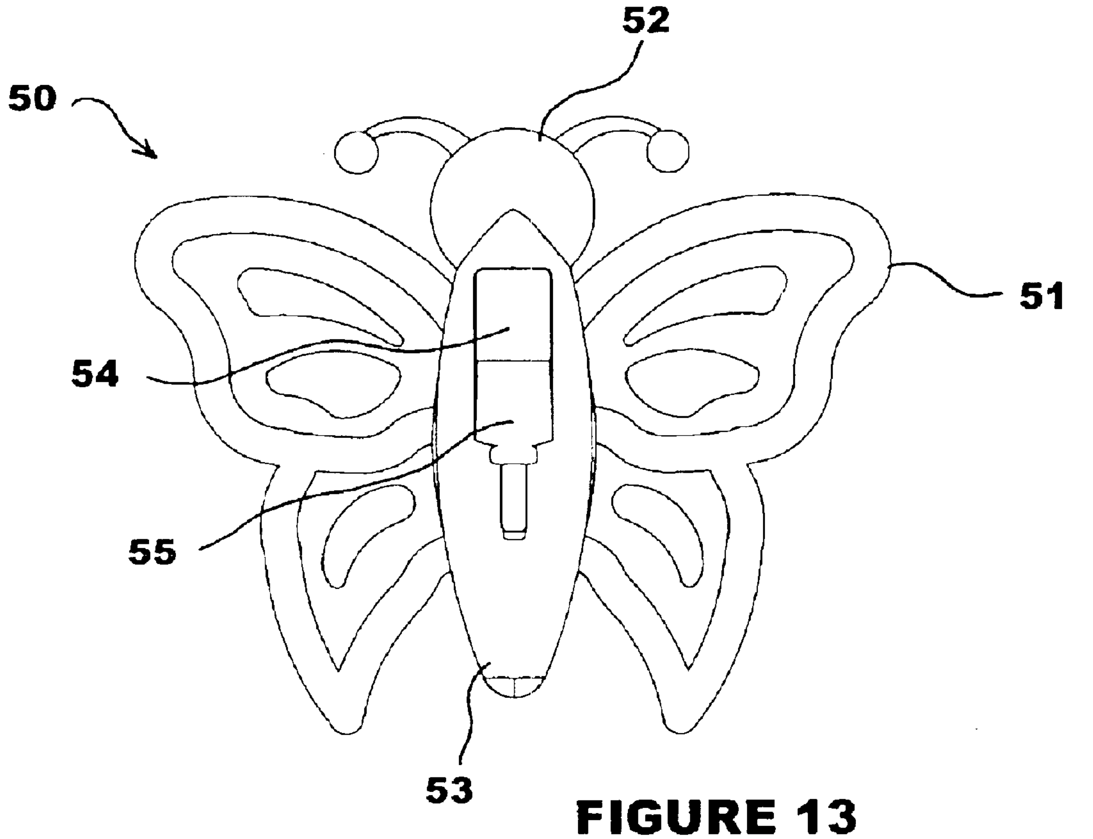
FIG. 13 is top plan view of the top member shaped like a butterfly for a third present preferred embodiment of the invention.
Figure 14:
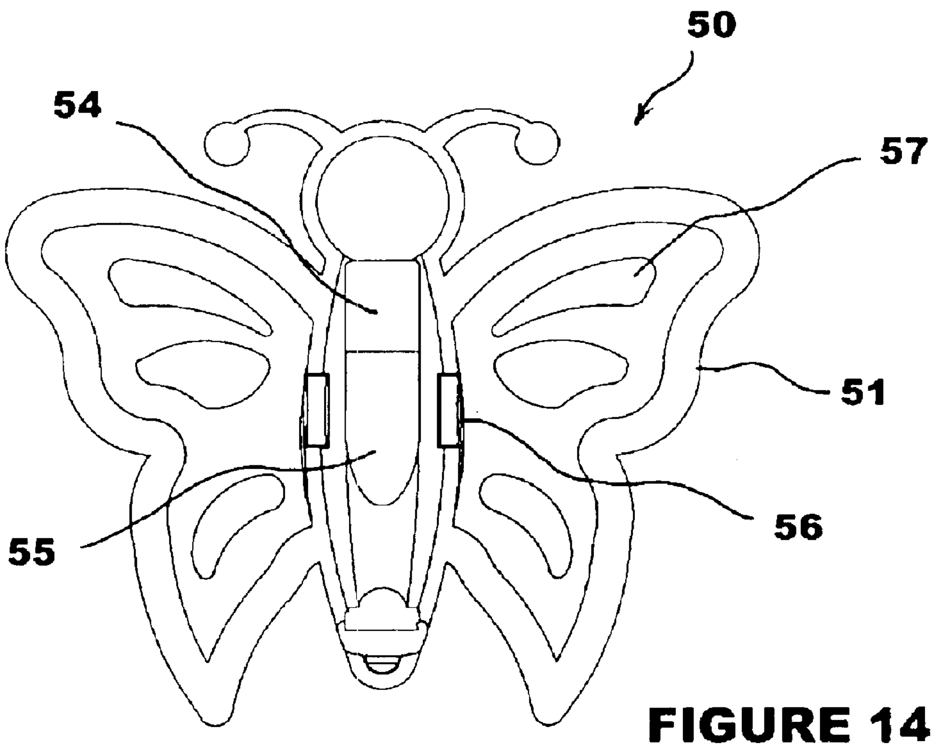
FIG. 14 is a bottom view of the top member shown in FIG. 13.
Figure 15:
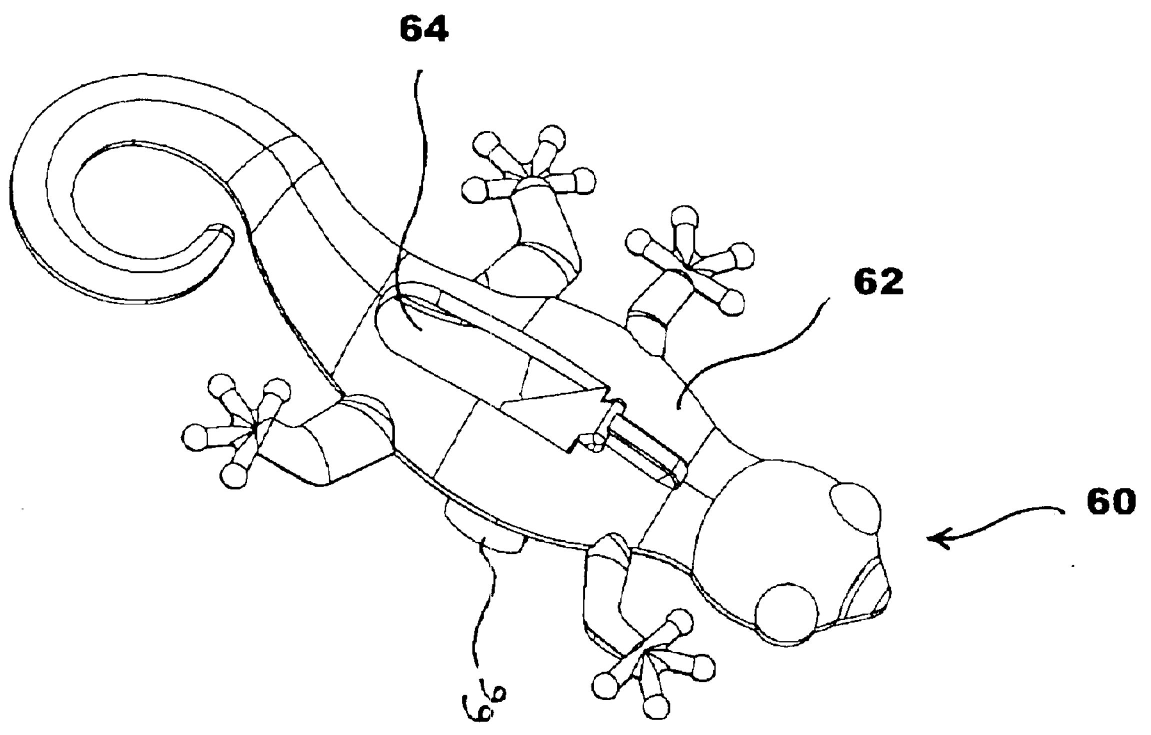
FIG. 15 is a top perspective view of the top member shaped like a lizard for a fourth present preferred embodiment.

A third present preferred spring clip is shaped like a butterfly and has a base member like those shown in FIGS. 4, 5, 9 and 10. The top member 50 of that embodiment is shown in FIGS. 13 and 14. In this embodiment a pair of wings 51 and a head 52 extend from an abdomen 53. There is a cutout 54 in the abdomen 53 behind the head 52 through which the spring of the base member extends. There is a sloped portion 55 in the abdomen 53 adjacent the cutout 54. The sloped portion allows the end of the spring to slide up onto the abdomen during assembly. Prongs or legs 56 similar to those in the previous embodiments extend from the underside of the abdomen and fit into the slots in the base. The wings 51 have decorative cutouts 57 and contours to simulate a butterfly wing.

A fourth present preferred embodiment of the spring clip has a top member shaped like a gecko lizard. That top member 60 is shown in FIG. 4. There is a cutout 64 in the body 62 through which the spring of the base member passes. Prongs or legs 66 similar to those in the other illustrated embodiments extend from the underside of the top member. Therefore, this lizard shaped top member can be assembled onto the base shown in FIGS. 4, 5 or the base shown in FIGS. 9 and 10 in the same manner as the fish, frog and butterfly top members.

It should be apparent that the top member could be configured as other animals, letters, geometric shapes and other structures. Like the fish, frog, butterfly and lizard top members shown in the drawings, all of these shapes can be mounted on the same base. Consequently, this two piece spring clip allows designers to create and manufacture an endless variety of spring clips all having the same base. For that reason the costs to expand a line of spring clips are much less than for any clip in the prior art.

Figure 16:
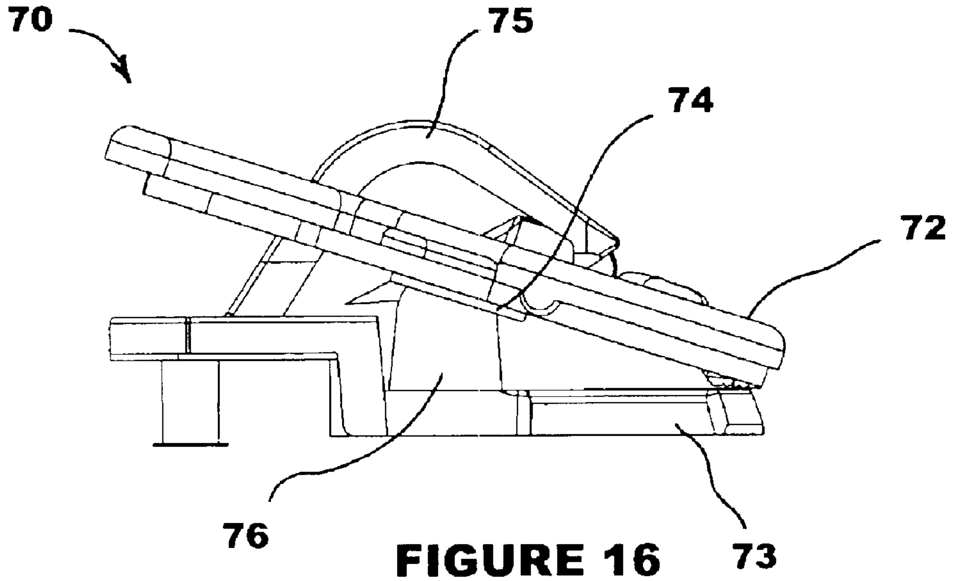
FIG. 16 is a side view of a fifth present preferred embodiment.
Figure 17:
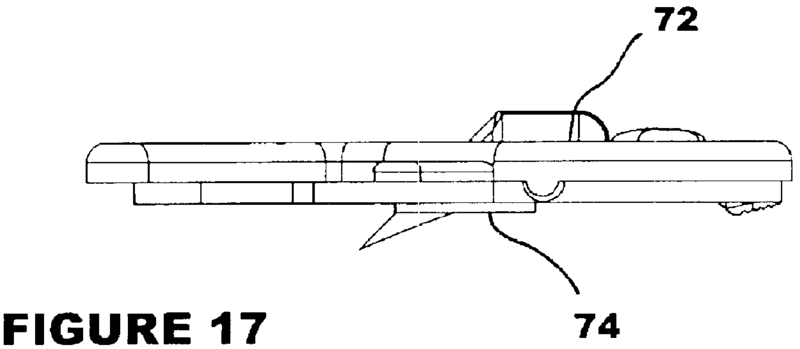
FIG. 17 is a side view of the top member in the embodiment shown in FIG. 16.
Figure 18:
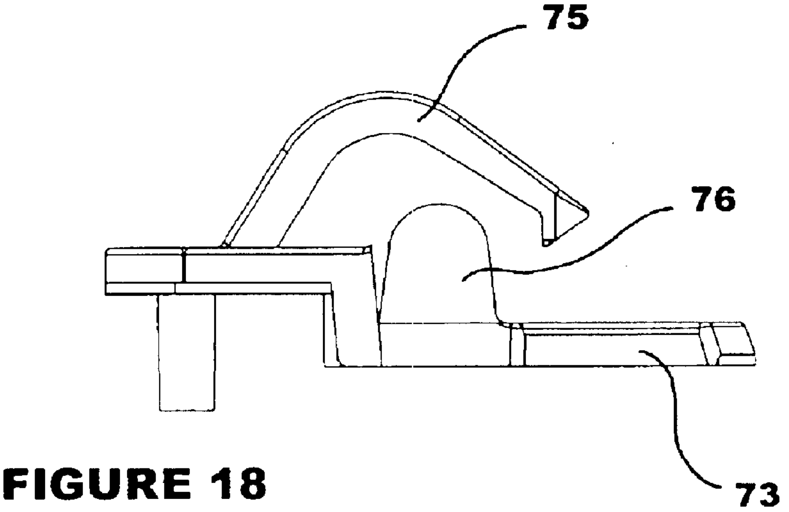
FIG. 18 is a side view of the base in the embodiment shown in FIG. 16.

A fifth present preferred embodiment shown in FIGS. 16, 17 and 18 is similar to the first embodiment. This two piece clip 70 has a top member 72 and a base 73. The top member 72 is similar in shape to the top member 2 in the first embodiment. However, in this embodiment there is a socket 74 or pair sockets on the underside of the top member 72. One or two prongs or legs 76 extend from the base 73 and are seated in each socket 74. Spring 75 extends from the base through a cutout in the top member. The top member 72 pivots on prongs or legs 76 from a closed position shown in FIG. 16 to an open position.

The top member and base member are preferably molded plastic parts that can be the same or different plastic material. While polycarbonate is the preferred plastic the spring clip and particularly the top member can be made from polyvinyl chloride, some polyurethanes, and other plastic materials. Alternatively, these parts could be metal. Indeed, the base member could easily be made as a metal stamping. The use of plastic allows the parts to be easily colored as pigments are added during molding. The top member and the bottom member could be the same color or different colors. I prefer to make the base member from a clear polycarbonate so that the top member is more dominant.

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

I claim:

1. A spring clip comprising:

a base member having an elongated body with a top surface and a bottom surface and an elongated spring extending over the top surface of the body, the spring having one end attached to the top surface and a distal end spaced apart from the top surface;

a top member having a body with a top surface and a bottom surface and a cutout through the body, the top member positioned opposite the top surface of the base such that the spring extends through the cutout and presses against the top surface of the top member and at least one leg attached to and extending from the bottom surface of the top member and resting on the base member;

wherein the base member has a slot positioned to receive the at least one leg, the slot formed by two spaced apart parallel sides, a closed back extending between the two parallel sides and an open front and further comprising a ramp extending through the open front and between the parallel sides such that the at least one leg is able to slide across the top surface of the base member, up the ramp and into the slot, the slot and at least one leg sized and positioned to enable the top member to pivot relative to the base member on the at least one leg.

2. The spring clip of claim 1 also comprising a tooth attached to the distal end of the spring.

3. The spring clip of claim 2 wherein the spring has a notch adjacent the tooth.

4. The spring clip of claim 1 wherein the top member has a slot on the top surface of the top member, the slot positioned between the cutout and the distal end of the spring.

5. The spring clip of claim 1 wherein the top surface of the top member has a ramp portion adjacent the cutout.

6. The spring clip of claim 1 further comprising a gripping surface on the bottom surface of the top member.

7. The spring clip of claim 1 wherein the top member is configured to be in the shape of a fish, frog, butterfly or lizard.

8. The spring clip of claim 1 also comprising a tooth on the distal end of the spring and a projection on the top surface of the top member, the projection positioned between the cutout and the distal end of the spring.

9. The spring clip of claim 8 further comprising a projection attached to the spring adjacent to and spaced apart from the tooth.

10. A spring clip also comprising:

a base member having an elongated body with a top surface and a bottom surface and an elongated spring extending over the top surface of the body, the spring having one end attached to the top surface and a distal end spaced apart from the top surface;

a tooth attached to the distal end of the spring, the tooth having a notch;

a top member having a body with a top surface and a bottom surface and a cutout through the body, the top member positioned opposite the top surface of the base such that the spring extends through the cutout and presses against the top surface of the top member;

a rib on the top surface of the top member at least a portion of the rib being within the notch; and at least one leg attached to and extending from the bottom surface of the top member and resting on the base member;

wherein the base member has a slot positioned to receive the at least one leg, the slot and at least one leg sized and positioned to enable the top member to pivot relative to the base member on the at least one leg.

11. A spring clip comprising:

a base member having an elongated body with a top surface and a bottom surface and an elongated spring extending over the top surface of the body, the spring having one end attached to the top surface and a distal end spaced apart from the top surface;

a top member having a body with a top surface and a bottom surface and a cutout through the body, the top member positioned opposite the top surface of the base such that the spring extends through the cutout and presses against the top surface of the top member, the top surface having a fin support portion extending between opposite edges of the top surface;

a pair of spaced apart fins attached to the fin support portion of the top surface of the top member, the fins positioned inboard from the opposite edges of the top surface such that the spring extends between the fins; and at least one leg attached to and extending from the bottom surface of the top member and resting on the base member;

wherein the base member has a slot positioned to receive the at least one leg, the slot and at least one leg sized and positioned to enable the top member to pivot relative to the base member on the at least one leg.

12. A clip for gripping an article, the clip comprising:

a first member comprising:

a body having an attachment end and a gripping end;

a resilient spring integrally protruding from the attachment end and directed toward the gripping end, the spring having a tip;

at least one socket formed on the body of the first member; and a second member having:

a first surface and a second surface;

an aperture through which the spring is received such that the tip of the spring bears upon the first surface of the second member biasing the second member toward the first member, and at least one prong protruding from the second surface and pivotally received in the at least one socket of the first member; and at least one grooved ramp leading to the at least one socket.

13. A spring clip comprising:

a first member comprising:

a body having an attachment end and a gripping end;

a resilient spring integrally protruding from the attachment end and directed toward the gripping end, the spring having a tip;

at least one socket formed on the body of the first member; and a second member having:

a first surface and a second surface;

an aperture through which the spring is received such that the tip of the spring bears upon the first surface of the second member biasing the second member toward the first member, and at least one prong protruding from the second surface and pivotally received in the at least one socket of the first member;

a tooth attached to the tip of the spring, the tooth having a notch; and a rib on the first surface of the second member at least a portion of the rib being within the notch.

* * * * *